INVENTOR.
ALAN J. FOX.
BY Stanley J. Price
his ATTORNEY.

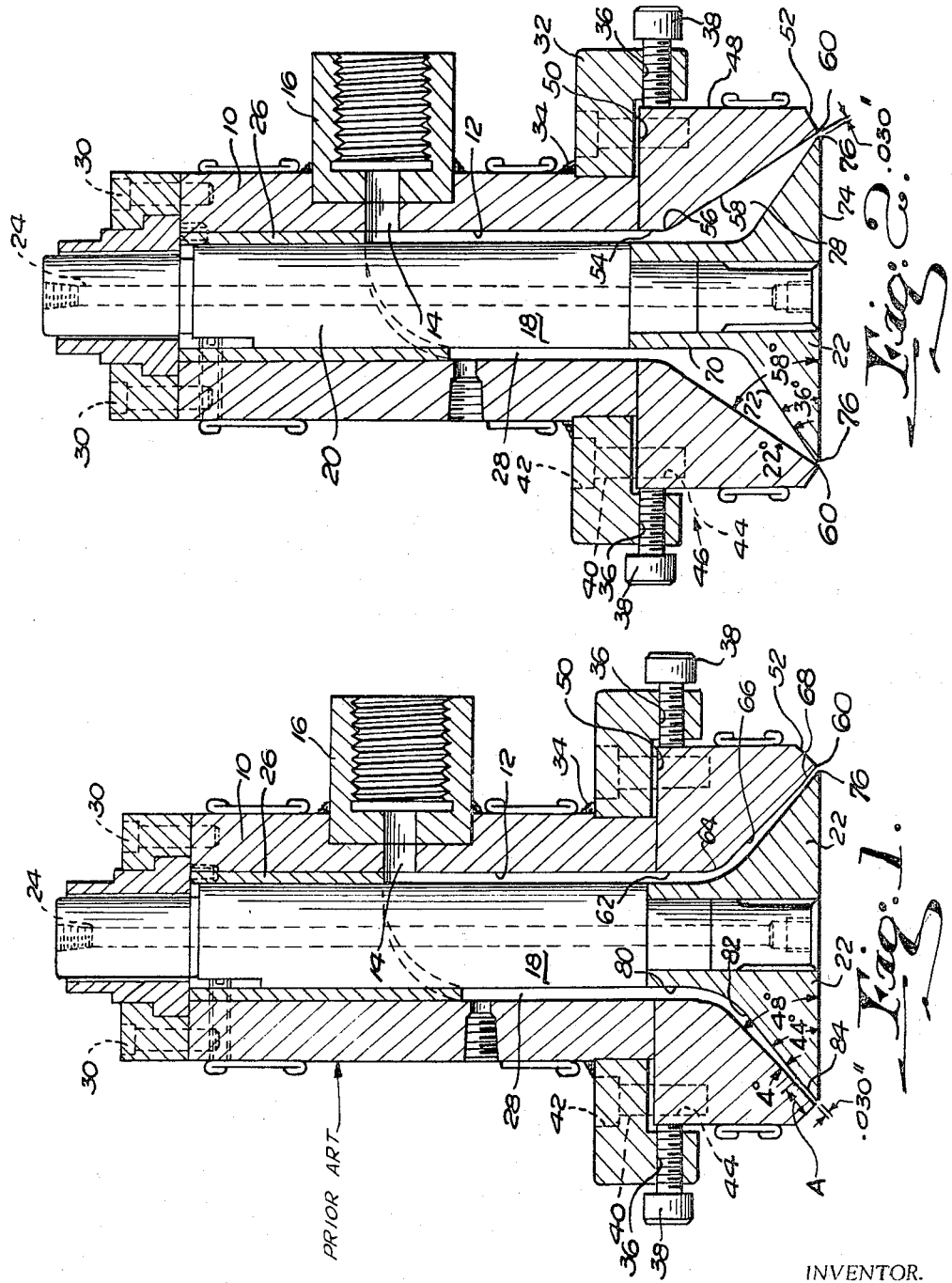

United States Patent Office 3,327,038
Patented June 20, 1967

3,327,038
EXTRUSION DIE
Alan J. Fox, Sewickley, Pa., assignor to Koppers Company, Inc., a corporation of Delaware
Filed June 24, 1965, Ser. No. 466,796
3 Claims. (Cl. 264—209)

This invention relates to an extrusion die and more particularly to an extrusion die adapted to control the thickness and density of a thermoplastic cellular sheet extruded therefrom.

Extrusion dies have been used in the past to form cellular sheets of expandable thermoplastic material. Difficulty has been encountered, however, in the control of the density and thickness of the cellular sheet. I have discovered by a simple and inexpensive modification in the configuration of the die that it is now possible to accurately control the gauge or thickness of the extruded cellular sheet and to obtain a cellular sheet product that has uniform cell size and a medium density.

With conventional extrusion dies the thickness of extruded thermoplastic sheet is largely dependent on die gap opening. The larger the die gap, the thicker the sheet. The thickness of the sheet may also be controlled by the takeaway of the extruded sheet. By drawing down on the web of extruded sheet within limitations it is possible to obtain thinner gauges than would be produced from a given die opening. The maximum thickness of the sheet is, however, controlled by the die gap opening. A conventional film die was set at a die gap opening of about 0.080" in an attempt to obtain a medium density sheet of polystyrene foam having a density of about 30 p.c.f. and a thickness of about 0.110". The sheet produced was of extremely poor quality with a varying thickness and the material tended to drag on the die, giving the sheet a rough surface. The cellular sheet product had undesirable large cell sizes. The configuration of the conventional film die was changed in accordance with my invention and cellular thermoplastic sheet material of excellent quality with a gauge thickness of about 0.110" was extruded with a die gap opening of about 0.040". A film die having the configuration hereinafter described now makes it possible to produce a medium density foamed product of a preselected desired thickness at a smaller die gap opening than was previously possible with a conventional die. By changing the angle of divergence between the surfaces of the die ring and mandrel as later discussed, it is now possible to accurately control the thickness of the sheet while the die gap opening is maintained substantially constant.

Although there are many design variations of plastic extrusion dies, to the best of my knowledge all of the known plastic extrusion dies contain a "land" at the lip where the thermoplastic material exits from the die. The land is two parallel surfaces, one on the external surface of the mandrel adjacent the lip and the other on the internal surface of the die ring adjacent the lip where the material exits from the die. The concept of including a land portion on the die is well established and appears in all of the basic equations related to die design, for example, see Bernhardt, "Processing of Thermoplastic Materials," Reinhold Publishing Corporation, New York, 1959. Usually the length of the land varies and depends on both the type of the die and the material being extruded. The dimension of the land may vary from ⅛" to 1" or more. Another item that is common to the known extrusion dies is the function of the approach angles of the surfaces adjacent the land. It was believed in the past that the approach angles served merely to bring the material gently up to the landed area. I have discovered by dispensing with the land and varying the divergent angle between the die ring and the mandrel that it is now possible to extrude thermoplastic materials at different sheet thicknesses without changing thet gap opening. Further, it is possible with my improved die to form medium density cellular sheets having desired cell structure and exterior surfaces.

Accordingly, the principal object of this invention is to provide an extrusion die that has divergent frusto conical surfaces on the die ring and mandrel.

Another object of this invention is to provide an extrusion die that permits a control of the extrudate thickness by the divergent angle between the frusto conical surfaces on the die ring and mandrel.

A further object of this invention is to provide an extrusion die for thermoplastic material that has fine and sensitive controls to form thermoplastic sheets of desired thickness and density.

Although the invention hereinafter will be described in conjunction with an annular film die, it should be understood that the invention may be applied with equal facility to other types of extrusion dies such as flat sheet design, shaping devices and the like.

The invention hereinafter will be described in conjunction with medium density polystyrene foam thermoplastic material. The invention is applicable to extrude other thermoplastic foams or cellular material such as low density polystyrene foam and polyvinylchloride foams and to nonfoaming thermoplastics such as polystyrene, polyvinylchloride and polyethylene.

In the drawings:

FIGURE 1 is a view in longitudinal section of a conventional poppet type extrusion die having landed areas adjacent the lips of the mandrel and die ring.

FIGURE 2 is a view in section similar to FIGURE 1 illustrating the configuration of my improved extrusion die wherein the internal surface of the die ring and the external surface of the mandrel are frusto conical in shape and dispense with the landed areas illustrated in the prior art conventional die of FIGURE 1.

Figure 3:
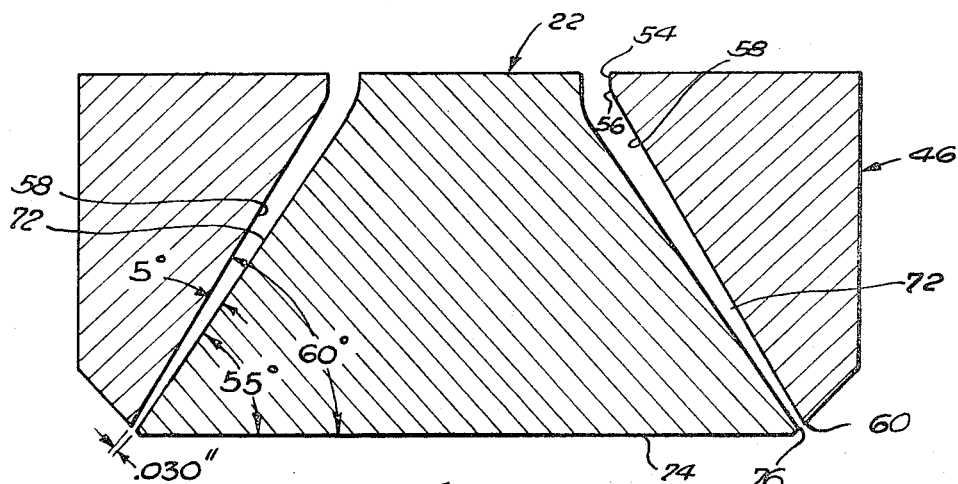
FIGURES 3 and 4 are enlarged sections of my improved extrusion die illustrating different angles of divergence between the surfaces of the die ring and the mandrel.

Referring to the drawings and particularly FIGURES 1 and 2, there is illustrated in FIGURE 1 a conventional poppet type die having a land lip where the extrudate exists from the die. FIGURE 2 illustrates my improved poppet type die that dispenses with the land and has divergent frusto conical surfaces on the mandrel and die ring. Other than the shape of the internal surface of the mandrel, both of the poppet dies in FIGURES 1 and 2 are of substantially the same construction and except for the inner surface of the die ring and the external surface of the mandrel similar numerals will indicate similar parts.

Referring to FIGURES 1 and 2, the poppet die has a cylindrical body portion 10 with an axial bore 12 and a radial opening 14. The radial opening 14 has a nipple 16 to which the extruder (not shown) is connected. Thus, the thermoplastic material to be extruded is fed into the cylindrical bore 12 from the extruder through the opening 14. Positioned within the cylindrical bore 12 is a mandrel assembly generally designated by the numeral 18 that has a cylindrical body portion 20 and a mandrel 22. The body portion 20 and mandrel 22 have a longitudinal bore 24 therethrough to supply air to the cylindrical extrudate formed by the extrusion die. An annular spacer and centering member 26 is positioned between the external surface of the body portion 20 and the internal portion of bore 12. The annular spacer 26 terminates adjacent the radial bore 14 in body portion 10 and serves to direct the thermoplastic material to the annular space 28 between the body portion internal surface 12 and the mandrel assembly cylindrical body portion 20. Suitable securing means 30 maintain the mandrel assembly body portion 20 in a preselected position within the body portion bore 12.

The body portion 10 has an annular die ring securing member 32 secured thereto as by welds 34. The die ring securing member has a plurality of threaded bores 36 therethrough and bolts 38 extend through the threaded bores 36 and serve to center the die ring relative to the mandrel 22. There are longitudinal bores 40 in the die ring securing member 32 and bolts 42 extend through the bores 40 into mating threaded bores 44 in a die ring 46. The bolts 42 secure the die ring 46 in fixed relation to body portion 10.

The die ring 46 is an annular member having a cylindrical outer surface 48 with a planar annular end wall 50 and an annular tapered other end wall 52 that intersects the cylindrical side wall 48. The die ring 46 illustrated in FIGURE 2 has a cylindrical internal surface 54 that terminates adjacent the planar end wall 50 at 56 and a frusto conical diverging internal surface 58 that in FIGURE 2 has an angle of inclination of 58°. The frusto conical surface 58 intersects the tapered end wall 52 at a lip or corner 60.

In FIGURE 1 the prior art die ring 46 has a cylindrical inner surface 62 that intersects the planar annular end wall 50 and extends downwardly to an outwardly flared portion 64. A frusto conical portion 66 extends from the outwardly flared portion 64 and has formed therein adjacent the lip or edge 60 a frusto conical portion 68 that is at a different angle of inclination than the frusto conical portion 66. The portion 68 forms one of the surfaces of the land in the die illustrated in FIGURE 1. The angle of divergence of the frusto conical portion 66 in FIGURE 1 is 48°, as indicated therein.

Referring again to FIGURE 2 and my improved extrusion die, the mandrel 22 is suitably secured to the body portion 20 to form the assembly 18. The mandrel 22 is positioned within the die ring bore 58 and has a cylindrical external surface 70 of substantially the same diameter as the body portion 20, a frusto conical external surface 72 and a planar end surface 74. The frusto conical surface 72 and planar end surface 74 intersect and form a circular edge or lip 76. The angle of inclination of the frusto conical portion 72 is 36°, as indicated in FIGURE 2. Thus, the difference in the angles of inclination between the frusto conical die ring internal surface 58 and the mandrel external frusto conical surface is 22°. The angular difference between the two surfaces will be referred to as the angle of divergence. With this configuration there is a substantial annular space 78 between the internal surface of die ring 46 and the external surface of the mandrel 22 that increases in cross section because of the angle of divergence. The lips 60 and 76 of the respective die ring 46 and mandrel 22 are spaced from each other a distance of about 0.030". This is the gap spacing for the extrusion die. The spacing of 0.030" is only present at the lips 60 and 76 and rapidly increases along the surfaces 58 and 72 because of the divergent angle therebetween.

In FIGURE 1 the prior art mandrel 22 has a cylindrical external surface 80 substantially the same diameter as the body portion 20, and a frusto conical external surface 82 and a frusto conical portion 84 that has a different angle of inclination than the portion 82. The surface portion 84 on mandrel 82 thus forms another surface for the land adjacent the lip 76 and is parallel to the frusto conical surface 68 on the die ring 46. Thus, for a distance equivalent to the length of surfaces 68 and 84 on the internal surface of die ring 46 and external surface of mandrel 22 the surfaces remain parallel and do not diverge for a substantial distance from the lips 60 and 76. In comparison with the configuration illustrated in FIGURE 2, there is only a 4° angle of divergence between the mandrel 22 and the die ring 46. The configuration illustrated in FIGURE 1 is the prior art type of extrusion die wherein the gap spacing in the die extends inwardly into the die for the distance indicated by the land, in FIGURE 1 the dimension of the land is indicated by the dimension A.

Figure 4:
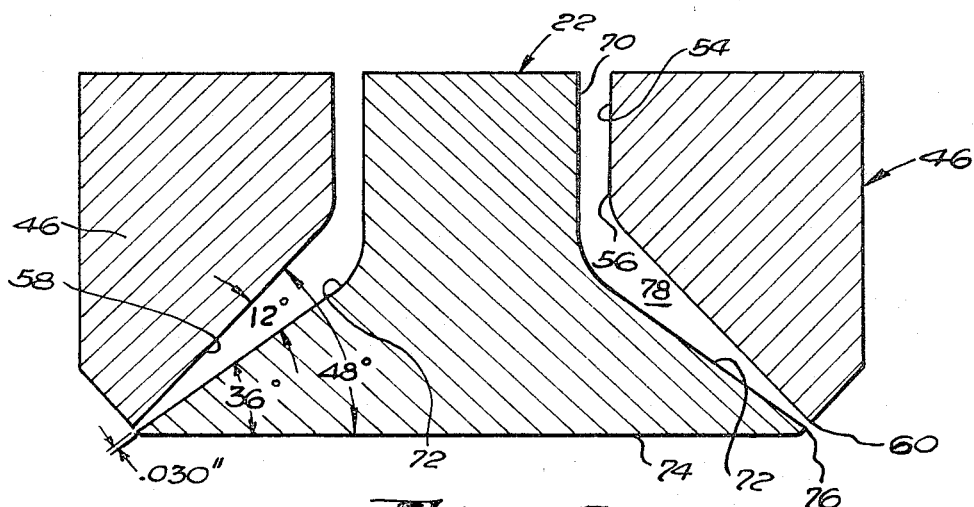

FIGURES 3 and 4 are enlarged diagrammatic illustrations of the mandrel and die ring with different angles of divergence between the mandrel frusto conical surface 72 and the die ring frusto conical surface 58. The gap spacing at the lips 60 and 76 is 0.030". In FIGURE 3 the angle of inclination of the mandrel surface 72 is 55° and the angle of inclination of the die ring internal surface 58 is 60°, thus providing an angle of divergence between the surfaces 72 and 58 of 5°. It should be noted that the gap spacing of 0.030" is present only at the lips 60 and 76 and the surfaces 58 and 72 diverge away from each other to increase the spacing between the surfaces. FIGURE 4 illustrates another configuration where the mandrel external surface 72 has an angle of inclination of 36° and the internal surface 58 of die ring 46 has an angle of inclination of 48° thus providing a 12° angle of divergence between the respective surfaces. The gap spacing at the lip of the mandrel and the die ring is 0.030".

An an example of the improved extrudate obtained with the previously described die as compared with a conventional die, expandable polystyrene material was extruded through the poppet die illustrated in FIGURES 1 and 2. It was desired to obtain a medium density sheet of cellular polystyrene having a density of about 30 pcf. and a thickness of about 0.110". The conventional film die similar to that illustrated in FIGURE 1 was opened to a die gap of about 0.080". It is conventional practice to have a die opening of about 0.020" for thin gauge film extrusion work. For heavy duty film of a thickness of 0.010" the opening is usually about 0.040". At the die gap opening of 0.080" the expandable polystyrene material was extruded from the conventional die as illustrated in FIGURE 1. The sheet was of extremely poor quality and had a varying thickness. The extrudate tended to drag on the die, resulting in a rough surface on the sheet. The cellular sheet product had an undesirable large cell size.

A poppet type die similar to that illustrated in FIGURE 2 had a gap opening of about 0.040". The same expandable polystyrene was extruded through the poppet die and a sheet of a thickness of 0.110" was produced. The sheet had a medium density and the cell size was smaller and more uniform throughout the sheet. The angle of inclination on both the die ring and the die mandrel and thus the angle of divergence were varied and polystyrene sheets having the properties set forth in Table I were obtained.

TABLE I

| Die | Land Length, in. | Die Ring Angle, deg. | Die Mandrel Angle, deg. | Included Divergence Angle, deg. | Die Gap Opening, in. | Sheet Properties | | | | |
|---|---|---|---|---|---|---|---|---|---|---|
| | | | | | | Sheet Density, p.c.f. | Average Sheet Thickness, in. | Range Sheet Cell Size | | |
| | | | | | | | | Top Surface, mils | Center, mils | Bottom Surface, mils |
| I | ½ | 48 | 44 | 4 | 0.030 | 37 | 0.052 | 8.6 to 9.3 | 7.2 to 7.9 | 7.2 to 7.9. |
| II | None | 60 | 55 | 5 | 0.030 | 34 | 0.058 | 7.2 to 8.6 | 5.7 to 7.2 | 6.4 to 7.2. |
| III | do | 48 | 36 | 12 | 0.030 | 33 | 0.069 | 7.2 to 10.7 | 7.2 to 8.6 | 6.4 to 7.9. |
| IV | do | 58 | 36 | 22 | 0.030 | 30 | 0.094 | 5.7 to 18.6 | 5.0 to 11.5 | 5.7 to 13.6. |

It is apparent with my improved extrusion die it is now possible to vary both the density of the sheet and the sheet thickness while maintaining the die gap opening substantially constant.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The method for controlling the thickness and quality of an extrudate emerging from a die chamber holding a quantity of molten thermoplastic material comprising the steps:
    (a) positioning a mandrel having a frusto conical portion in a frusto conical bore in the end of said die chamber, said frusto conical walls being relatively angularly divergent from a die gap of preselected fixed dimensions; and
    (b) varying said angle of relative divergence and maintaining the preselected fixed dimensions of said die gap to control the thickness and quality of said extrudate.

2. The method of claim 1 wherein:
    (a) the angle of relative divergence is varied between 5° and 22°.

3. The method for controlling the thickness and quality of an extrudate emerging from a die chamber holding a quantity of molten thermoplastic material comprising the steps:
    (a) flowing said material through a uniform annular gap of preselected fixed dimension that constitutes a die opening by way of a tapered annular passageway whose walls angularly diverge from said gap at an angle in the range of 5°–22°; and
    (b) maintaining said gap at said preselected fixed dimension but vary the thickness of said extrudate by varying the angular divergence of said walls of said passageway.

References Cited

UNITED STATES PATENTS

| | | | |
|---|---|---|---|
| 2,090,404 | 8/1937 | Parkhurst | 18—12 |
| 2,325,574 | 7/1943 | Wunderer | 18—12 X |
| 2,633,602 | 4/1953 | Sverdrup. | |
| 3,039,143 | 6/1962 | Nicholson | 18—12 |
| 3,205,534 | 9/1965 | Langecker | 18—14 |
| 3,223,761 | 12/1965 | Raley | 18—13 X |

WILLIAM J. STEPHENSON, *Primary Examiner.*